(12) United States Patent
Wu et al.

(10) Patent No.: US 9,323,910 B2
(45) Date of Patent: Apr. 26, 2016

(54) METHOD, CLIENT AND SERVER OF PASSWORD VERIFICATION, AND PASSWORD TERMINAL SYSTEM

(71) Applicant: Alibaba Group Holding Limited, Grand Cayman (KY)

(72) Inventors: Bin Wu, Hangzhou (CN); Haiquan Yang, Hangzhou (CN); Shifeng Li, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 200 days.

(21) Appl. No.: 14/050,248

(22) Filed: Oct. 9, 2013

(65) Prior Publication Data
US 2014/0101742 A1   Apr. 10, 2014

(30) Foreign Application Priority Data
Oct. 10, 2012   (CN) .......................... 2012 1 0382989

(51) Int. Cl.
| | | |
|---|---|---|
| *H04L 29/06* | (2006.01) | |
| *G06F 21/31* | (2013.01) | |
| *G06F 21/36* | (2013.01) | |
| *G06F 21/34* | (2013.01) | |
| *H04W 12/12* | (2009.01) | |

(52) U.S. Cl.
CPC ............... *G06F 21/31* (2013.01); *G06F 21/34* (2013.01); *G06F 21/36* (2013.01); *H04L 63/083* (2013.01); *H04L 63/18* (2013.01); *H04W 12/12* (2013.01)

(58) Field of Classification Search
CPC ......... G06F 21/34; G06F 21/36; G06F 21/46; H04L 63/083; H04L 63/18
USPC .................... 726/7, 18, 19; 713/183
See application file for complete search history.

(56) References Cited

U.S. PATENT DOCUMENTS

| | | | |
|---|---|---|---|
| 2009/0313693 A1* | 12/2009 | Rogers ........................... | 726/21 |
| 2009/0320124 A1 | 12/2009 | Taxier et al. | |
| 2010/0050242 A1 | 2/2010 | Delia et al. | |
| 2010/0180336 A1 | 7/2010 | Jones et al. | |
| 2010/0186074 A1 | 7/2010 | Stavrou et al. | |
| 2011/0202982 A1 | 8/2011 | Alexander et al. | |
| 2012/0249450 A1* | 10/2012 | Haff et al. ..................... | 345/173 |
| 2012/0304284 A1 | 11/2012 | Johnson et al. | |
| 2013/0031623 A1 | 1/2013 | Sanders | |
| 2013/0036462 A1 | 2/2013 | Krishnamurthi | |

(Continued)

FOREIGN PATENT DOCUMENTS

WO   WO2012046099   4/2012

OTHER PUBLICATIONS

PCT Search Report and Written Opinion mailed Dec. 13, 2013 for PCT application No. PCT/US13/64169, 8 pages.

*Primary Examiner* — Izunna Okeke
*Assistant Examiner* — Hee Song
(74) *Attorney, Agent, or Firm* — Lee & Hayes, PLLC

(57) ABSTRACT

The present disclosure provides techniques for authenticating a password. These techniques may enable a user terminal to retrieve a diagram using a computing device. The diagram is inputted by a user in a terminal and is displayed in form of a diagram in connection to a password. The computing device may then transfer operand points passed through by the diagram to a server terminal for password authentication, and then receive a result of the password authentication from the server terminal. These techniques improve password authentication security.

17 Claims, 12 Drawing Sheets

(56) References Cited

U.S. PATENT DOCUMENTS

| | | | |
|---|---|---|---|
| 2013/0047236 A1* | 2/2013 | Singh | 726/7 |
| 2013/0139248 A1* | 5/2013 | Rhee et al. | 726/19 |
| 2013/0167225 A1 | 6/2013 | Sanft et al. | |
| 2013/0198826 A1 | 8/2013 | Waldron | |
| 2014/0289870 A1* | 9/2014 | Selander et al. | 726/28 |
| 2015/0143509 A1* | 5/2015 | Selander | G06F 21/46 726/18 |

* cited by examiner

METHOD, CLIENT AND SERVER OF PASSWORD VERIFICATION, AND PASSWORD TERMINAL SYSTEM

CROSS REFERENCE TO RELATED PATENT APPLICATIONS

This application claims priority to Chinese Patent Application No. 201210382989.8, filed on Oct. 10, 2012, entitled "Method, Client and Server of Password Verification, and Password Terminal System," which is hereby incorporated by reference in its entirety.

TECHNICAL FIELD

The present disclosure relates to a field of information security technology, and more particularly, to methods and systems for authenticating a password.

BACKGROUND

With the development of Internet technology, networking utilization becomes more and more popular, such as online banking, online trading, virtual private network (VPN), etc. These kinds of networking utilization involve some sensitive information (e.g., financial or social data associated with a user), which requires high security. For example, a user may request identity authentication to conduct transactions online.

The conventional technology for protect user information is mainly implemented using multiple processes of authentication, such as a license authentication, an email authentication, etc. However, the authentication certificate has problems. For example, a license has to be installed and therefore is limited to be used on the computer that is currently being used. Moreover, the email authentication has a risk that an account for authentication can be stolen.

With the increasing complexity of scenarios, implementation of dynamic passwords (e.g., One Time Password as a dynamic password (OTP)) are gradually gaining favor. For example, hardware products, such as "e-payment security service of Alipay" and "e-payment security service of NetEase," are widely used. These hardware products are easy to carry, have high security, and are easy to use. However, these hardware products are also easy to lose as well as expensive, and have limited time period for the usage.

A dynamic password product of a mobile device (e.g., a mobile phone, a tablet computer, etc.) is a user terminal software for a mobile device, and can be used to generate a dynamic password. During a process of password generation, there is not any communication required for the mobile device; so the password would not be intercepted in a communicating channel, and the process is not affected if the mobile device is in arrear or fails to receive signals. Since the dynamic password product of a mobile device has many advantages (e.g., high security, low-cost, no need to extra carry, no business distributing process required, etc.), it is gradually becoming a mainstream product of mobile communicating password authenticating.

A dynamic password product of a mobile device is implemented by displaying a dynamic password according to a time section. The product also ensures that the mobile device terminal and the server terminal are both using the same algorithm that is calculating to obtain the same numbers or the same alphabets. In general, techniques for password authentication cause a dynamic password product of a mobile device to display a password in the form of numbers or letters on a mobile device, allow a user to enter the password in a user terminal, and then facilitate the user terminal to execute password authentication. The techniques also may compare the password entered and the password retrieved from a server terminal to thus determine whether the user is authorized to access the information.

Since the password is in form of numbers or letters, the authentication process is inevitably executed after the numbers or the letters are entered into an input field(s). Therefore, a phishing site or a fake user terminal is able to produce a false password easily. In other words, the conventional authentication process has a high risk of being cheated by a malicious side, and therefore leads to low online security.

In summary, there is an urgent need for a person skilled in the art to solve the technical problem regarding how to improve the password authentication.

SUMMARY

The present disclosure provides methods and systems for authenticating a password. In some embodiments, to solve the above problems, the present disclosure provides a method for authenticating a password. The method may include enabling, by a computing device, a user terminal to retrieve a second diagram that is inputted by a user in a second terminal. In these instances, the second diagram is imitated from a first diagram, which is generated in a first terminal and is displayed in form of a diagram in connection to a first password. The computing device may transfer operand points passed through by the second diagram to a server terminal for password authenticating, and receive a result of password authenticating from the server terminal.

In some embodiments, the first password is obtained by a first terminal in accordance with a password algorithm, or the first password is obtained by the server terminal of the second terminal based on a password algorithm before it is sent to the first terminal.

In some embodiments, the computing device may also encrypt the operand points passed through by the second diagram by applying a front end script technology. In these instances, the computing device may enable the user terminal to send the operand points passed through by the second diagram to the server terminal for password authentication.

In some embodiments, both of the first diagram and the second diagram are a diagram of one drawn line (e.g., folded line).

In some embodiments, the computing device may receive, from the user terminal, operand points that have been passed through by the second diagram. In these instances, the password authentication may be executed in a server terminal by comparing the operand points passed through by the second diagram and diagram operand points corresponding to characters of a second password. In addition, the second diagram is imitated from the first diagram that is generated in the first terminal and is displayed with a diagram in connection with the first password. In some embodiments, the first password and the second password synchronously exist. In these instances, the computing device may enable the server terminal to return a result of password authenticating to the user terminal.

In some embodiments, the diagram operand points corresponding to characters of the second password are grabbed by enabling a user terminal to retrieve the diagram operand points corresponding to the characters of the second password, and sending the grabbed diagram operand points to the server terminal. In some embodiments, the diagram operand points corresponding to characters of the second password are grabbed by enabling a server terminal to retrieve the diagram operand points corresponding to the characters of the second password.

In some embodiments, the diagram operand points corresponding to the characters of the second password are grabbed by selecting a diagram starting point as a diagram operand point corresponding to a first character of the second password, and retrieving the diagram operand point corresponding to a continuing character of the second password, in accordance with a predetermined direction of the current diagram operand point in correspondence with the current character of the second password.

In some instances, the computing device may further stop retrieving a diagram operand point corresponding to the continuing character of the second password in response to a determination that the current diagram operand point corresponding to the current character of the second password encounters a dead end.

In some instances, the computing device may process updating of the current character of the second password, when the current diagram operand point corresponding to the current character of the second password does not encounter a dead end and the predetermined direction of the current diagram operand point encounters a boundary hitting or is in repetition, and then determine a predetermined direction in correspondence with the diagram operand point of the updated current character of the password.

In some instances, the computing device may configure a diagram operand point corresponding to the predetermined direction of the current operand point as a diagram operand point corresponding to the continuing character of the second password.

In some embodiments, the predetermined direction of the current diagram operand point corresponding to the current character of the second password may be determined by processing a first modularizing operation in relation to the second password, and by configuring a predetermined direction corresponding to a result of the first modularizing operation as a predetermined direction of the current diagram operand point corresponding to the current character of the second password. In these instances, the predetermined direction is selected from directions including directions of east, south, west, north, southeast, northeast, southeast and northwest.

In some embodiments, the current diagram operand point corresponding to the current character of the second password is determined as encountering a dead end may be determined by determining the current diagram operand point corresponding to the current character of the second password as encountering a dead end, if the predetermined direction of the current diagram operand point corresponding to the current character of the second password encounters a wall-hitting, and the diagram operand point corresponding to other predetermined direction is the same as a diagram operand point corresponding to the obtained character of the password.

In some embodiments, the diagram operand point may be associated with a corresponding value and the predetermined direction is with a corresponding hitting value. In these instances, the determining the current diagram operand point corresponding to the current character of the second password as encountering a dead end is processed by summing up a value of the current diagram operand point corresponding to the current character of the second password and a value of the corresponding predetermined direction, and determining the predetermined direction of the current diagram operand point corresponding to current character of the second password as encountering a wall-hitting with respect to a upper boundary and a lower boundary if the summing up result is not a value within a scope of all diagram operand points in a diagram pattern. In some embodiments, the computing device may process a second modularizing operating in relation to a value of the current diagram operand point corresponding to the current character of the second password, and determining the predetermined direction of the current diagram operand point corresponding to the current character of the second password as encountering a wall-hitting with respect to a left boundary and a right boundary if the predetermined direction of the current diagram operand point corresponding to the current character of the second password matches with a pre-configured hitting value of the second modularizing operation result.

In some embodiments, the computing device may determine the predetermined direction of the current diagram operand point corresponding to the current character of the password as encountering a repetition, when a diagram operand point of the predetermined direction of the current diagram operand point corresponding to the current character of the second password is the same as the diagram operand point corresponding to the obtained character of the second password.

In some embodiments, each of the first diagram and the second diagram is a diagram of a folded line. In some embodiments, each of the first diagram and the second diagram is a diagram of a folded line with a single stroke.

The present disclosure also relates to a method for displaying a password in a terminal. The method may include generating, by a computing device, a first diagram in connection to a first password in a first terminal, and displaying the first diagram in the first terminal.

In some embodiments, the computing device may retrieve diagram operand points corresponding to characters of the first password, and connect diagram operand points corresponding to characters of the first password in sequence in the first terminal to obtain a first diagram.

In some embodiments, the diagram operand points corresponding to characters of the first password are grabbed by selecting a diagram starting point as a diagram operand point corresponding to a first character of the first password, and retrieving the diagram operand point corresponding to a continuing character of the first password, in accordance with a predetermined direction of the current diagram operand point in correspondence with the current character of the first password.

In some embodiments, the computing device may stop retrieving of diagram operand point corresponding to the continuing character of the first password when the current diagram operand point corresponding to the current character of the first password encounters a dead end.

In some embodiments, the computing device may process updating for the current character of the first password, when the current diagram operand point corresponding to the current character of the first password does not encounter a dead end and the predetermined direction of the current diagram operand point encounters a wall or boundary hitting or a repetition. Then, the computing device may determine a predetermined direction in correspondence with the diagram operand point of the updated current character of the password.

In some embodiments, the computing device may configure a diagram operand point corresponding to the predetermined direction of the current operand point as a diagram operand point corresponding to the continuing character of the first password.

In some embodiments, the computing device may determine the predetermined direction of the current diagram operand point corresponding to the current character of the first password by processing a first modularizing operation in relation to the first password, and configuring a predetermined direction corresponding to a result of the first modularizing operation as a predetermined direction of the current diagram operand point corresponding to the current character of the first password, wherein the predetermined direction is selected from directions comprising directions of east, south, west, north, southeast, northeast, southeast and northwest.

In some embodiments, the computing device may determine that the current diagram operand point corresponding to the current character of the first password is determined as encountering a dead end by determining the current diagram operand point corresponding to the current character of the first password as encountering a dead end, if the predetermined direction of the current diagram operand point corresponding to the current character of the first password encounters a wall-hitting, and the diagram operand point corresponding to other predetermined direction is the same as a diagram operand point corresponding to the obtained character of the first password.

In some embodiments, the diagram operand point may be associated with a corresponding value and the predetermined direction is with a corresponding hitting value. In these instances, the determining the current diagram operand point corresponding to the current character of the first password as encountering a dead end is processed by summing up a value of the current diagram operand point corresponding to the current character of the first password and a value of the corresponding predetermined direction, and determining the predetermined direction of the current diagram operand point corresponding to current character of the first password as encountering a wall-hitting with respect to a upper boundary and a lower boundary if the summing up result is not a value within a scope of all diagram operand points in a diagram pattern. In some embodiments, the computing device may process a second modularizing operating in relation to a value of the current diagram operand point corresponding to the current character of the first password, and determining the predetermined direction of the current diagram operand point corresponding to the current character of the first password as encountering a wall-hitting with respect to a left boundary and a right boundary if the predetermined direction of the current diagram operand point corresponding to the current character of the first password matches with a pre-configured hitting value of the second modularizing operation result.

In some embodiments, the computing device may determine the predetermined direction of the current diagram operand point corresponding to the current character of the first password as encountering a repetition by determining the predetermined direction of the current diagram operand point corresponding to the current character of the first password as encountering a repetition, when a diagram operand point of the predetermined direction of the current diagram operand point corresponding to the current character of the first password is the same as the diagram operand point corresponding to the obtained character of the first password.

In some embodiments, each of the first diagram and the second diagram is a diagram of a folded line.

The present disclosure also relates to a computing device (e.g., a user terminal) for authenticating password authenticating. The computing device may include a retrieving module configured to retrieve a second diagram that is inputted by a user in a second terminal. In these instances, the second diagram is imitated from a first diagram that is generated in a first terminal and is displayed in form of a diagram in connection to a first password.

The computing device may also include a sending module configured to transfer operand points that have been passed through by the second diagram to a server terminal for password authenticating. The computing device may also include a receiving module configured to receive a result of password authenticating from the server terminal.

The present disclosure also relates to a computing device (e.g., a server terminal) for authenticating password authenticating. The computing device may include a receiving module configured to receive, from the user terminal, operand points that have been passed through by the second diagram. The computing device may also include a password authenticating module configured to execute password authenticating in the server terminal by comparing the operand points that have been passed through by the second diagram and diagram operand points corresponding to characters of a second password, wherein the second diagram is imitated from the first diagram, the first diagram is generated in the first terminal and is displayed with a diagram in connection to the first password, and the first password and the second password are synchronously existing. The computing device may also include a returning module configured to, for return a result of password authenticating to the user terminal.

The present disclosure also relates to a terminal password system. The system may include a diagram generating module configured to generate a first diagram in connection to a first password in a first terminal. The system may also include a diagram displaying module configured to display the first diagram in the first terminal.

In comparison with the conventional authentication certificate that is inputted in form of blocks of input field, the present disclosure outstandingly provides an input authentication certificate in a form of a diagram. An input authentication certificate in a form of a diagram requires a much larger amount of code and the degree of difficulty thereof is also much more difficult as compared with an input authentication certificate in a form of blocks of input field. In other words, a production cost and the degree of difficulty for generating a diagram pattern are much higher than that for producing blocks of input field; so embodiments of the present disclosure bring a substantial degree of imitating difficulty for a malicious website to thus enhance the security of password authentication.

Moreover, as considering memorizing a password in a viewpoint of a user, it is well-known that a human's brain can remember a diagram much easier than characters of letters and/or numbers. Therefore, as compared with the defects existing in the prior art that a typographical error input always mistakenly happens when the characters have a long length or the characters are ones that are not easy to be memorized or are easy to be in typographical error, the password of the present disclosure that is in form of diagram can be easily memorized and operated to thus improve the accuracy of password authentication.

In addition, a front end script technology of JavaScript, jQuery, FLASH, etc. can be applied on the webpage to encrypt the authentication certificate of the diagram pattern inputted by a user before the authentication certificate is sent to the server terminal. Since the authentication certificate received by the user has been encrypted, the present disclosure, as compared with the prior art, can further prevent the risk of receiving a faked authentication certificate to thus improve the password authenticating security.

Furthermore, as compared with the prior art that needs to sequentially input several passwords in several input fields; the present disclosure enables a user to input a second diagram in a form of a single stroke diagram on the user terminal. Therefore, this improves the input efficiency of authentication certificate for a user terminal, and increases the efficiency of password authentication.

This Summary is not intended to identify all key features or essential features of the claimed subject matter, nor is it intended to be used alone as an aid in determining the scope of the claimed subject matter.

BRIEF DESCRIPTION OF THE DRAWINGS

The structure and the technical means adopted by the present disclosure to achieve the above and other objects can be understood by referring to the following detailed description of the embodiments and the accompanying drawings.

DETAILED DESCRIPTION

To better understand above objects, features and advantages of the present invention, the present disclosure is described in detail with embodiments thereof in connection with the accompanying drawings as below.

In general, password authentication is mainly formed by two phases including a phase of displaying an authentication certificate and a phase of inputting the authentication certificate. The former is mainly for displaying a password to a user. The latter is for authentication of a password that is imitatively inputted by a user. The imitatively input indicates that the input is an imitated content from the displayed content.

Since a One Time Password (OTP) of a mobile device is basically composed of numbers or letters, the phishing sites can generate a fake input authentication certificate by a simple block of an input field during the phase of inputting the authentication certificate. The block of the input field is very easily produced and the production cost is low.

If the degree of difficulty and the production cost for inputting the authentication certificate can be increased, the phishing sites will encounter difficulties of complexity for the fraud so as to discourage the fraud. Therefore, as compared with the conventional technology employing blocks of input field, the present disclosure innovatively provides an input authentication certificate in a form of a diagram. The degree of difficulty and a production cost for generating an input field is low and the amount of coding thereof is less, i.e., generally, it requires only one line of coding amount. On the contrary, the degree of difficulty for producing a diagram pattern is high, and it often requires several lines of coding amount, so the degree of difficulty and the code amount needed for making a diagram pattern are much higher than that for making the blocks of input field. In other words, the present disclosure is achieved based on a fact that a production cost and the degree of difficulty for making the diagram pattern are much higher than a production cost and the degree of difficulty for making the blocks of input field, to thus increase the degree of difficulty for the fraud so as to improve the security of password authentication.

Figure 1:
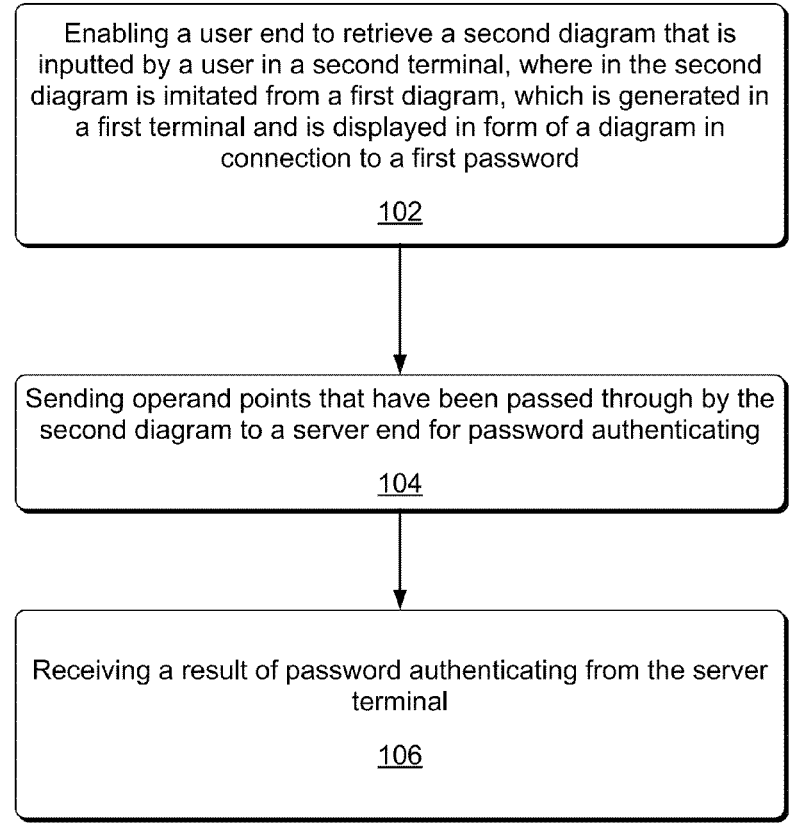
FIG. 1 is a flow chart illustrating a method for authentication a password.

FIG. 1 is a flow chart illustrating a method for authentication a password. At 102, a computing device may enable a user terminal to retrieve a second diagram that is inputted by a user in a second terminal. The second diagram may be imitated from a first diagram that is generated in a first terminal and is displayed in form of a diagram in connection to a first password.

At 104, the computing device may transfer operand points that have been passed through by the second diagram to a server terminal for password authentication. At 106, the computing device may receive a result of password authentication from the server terminal.

In some embodiments, the first terminal can be used for displaying the authentication certificate, and the second terminal can be used for inputting the authentication certificate and for authentication the password. For example, to improve a user's experience, the first terminal may be a mobile terminal, and the second terminal may be a mobile terminal or a fixed terminal. It is noted that, in a practical embodiment, the first terminal and the second terminal may be required to use different terminal interfaces for password authentication. The present disclosure does not specifically limit the first terminal and the specific second terminal.

In some embodiments, the first password may be obtained by a first terminal in accordance with a password algorithm, or the first password may be obtained by the server terminal of the second terminal based on a password algorithm before the first password is sent to the first terminal.

In some embodiments, a time seed synchronization mechanism used for traditional OTP can be used. In other words, the first terminal and the second terminal both may possess the same time seed growing algorithm to ensure that the first terminal and the second terminal are calculating with the same password coming out (e.g., a number of 567890) based on the same algorithm within the same effective time period. In these instances, the password may be periodically changed for a specific time interval, for example, for every 30 seconds, 60 seconds, etc. The basic principle for password authentication is well known, and therefore there is no description for it. Assuming that the password obtained in the server terminal of the second terminal is a second password, the first password and the second password should be passwords that are synchronous (e.g., the same password within the same effective time period).

In some embodiments, the server terminal of the second terminal may obtain the second password based on the password algorithm and then send the second password as the first password to the first terminal. In some embodiments, the displaying authentication certificate in a form of a diagram pattern may be employed and the authentication certificate in a form of a diagram pattern is imputed. In a phase of displaying authentication certificate, a first diagram is generated in a first terminal and is displayed in a form of a diagram in connection to a first password. In a phase of inputting the authentication certificate, a user terminal of a second terminal grabs a second diagram that is inputted by a user and sends operand points passed through by the second diagram to a server terminal for password authentication and then receives a result of password authentication from the server terminal.

Figure 2:
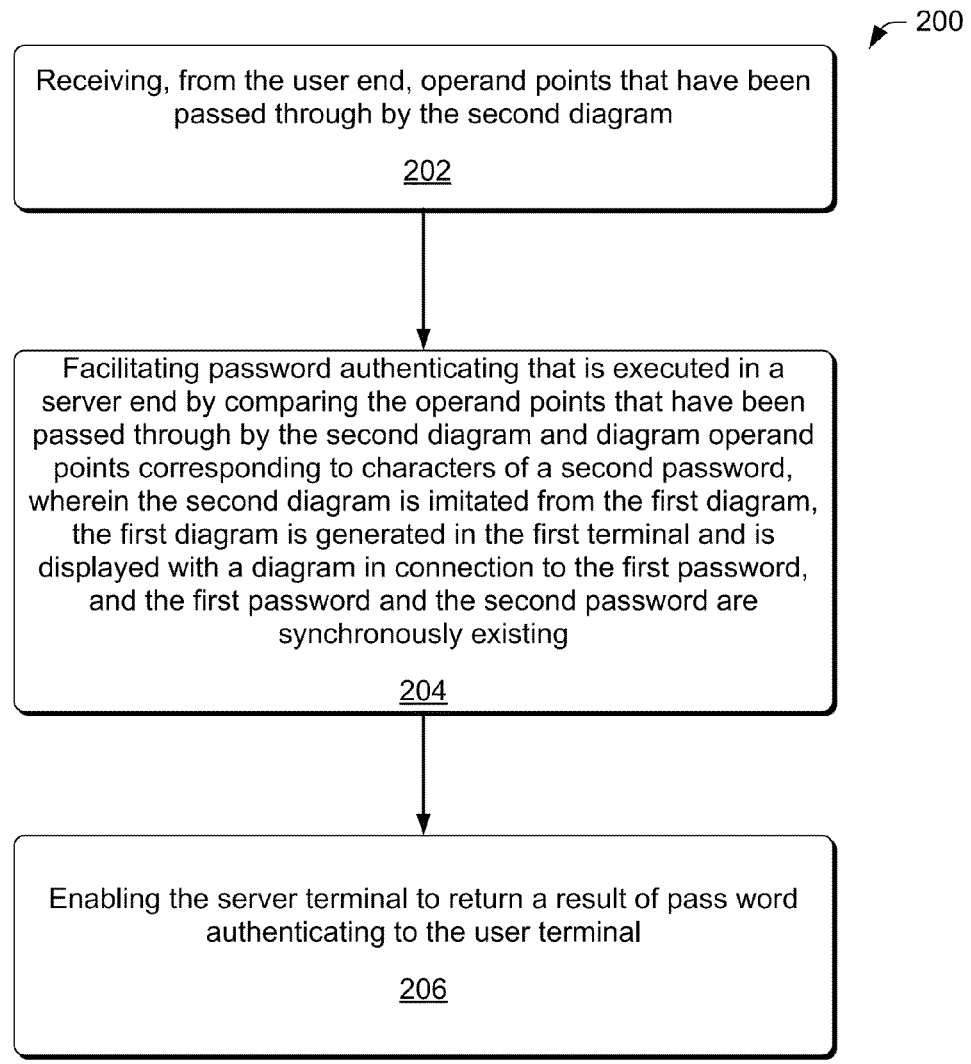
FIG. 2 is a flow chart illustrating a method for authentication a password.

FIG. 2 is a flow chart illustrating a method for authentication a password. At 202, a computing device may receive, from the user terminal, operand points that have been passed through by the second diagram. At 204, the computing device may execute password authentication by comparing the operand points that have been passed through by the second diagram and diagram operand points corresponding to characters of a second password. The second diagram is imitated from the first diagram, the first diagram is generated in the first terminal and is displayed with a diagram in connection to the first password, and the first password and the second password synchronously exist.

At 206, the computing device may enable the server terminal to return a result of password authentication to the user terminal.

Because the first password and the second password synchronously exist, in a condition that both of the first diagram and the second diagram are corresponding to the same diagram pattern, the diagram operand points passed through by the diagram with respect to the two passwords will be the same. As a result, as long as the user can exactly imitate the first diagram, the password authentication can be accomplished by ensuring the consistency there between as comparing the diagram operand points that have been passed through by the second diagram and diagram operand points corresponding to characters of a second password.

In some embodiments, each of the first diagram and the second diagram is a diagram of a folded line. In a specific implementation, the diagram pattern may be configured in accordance with the amount of operand points of the password intended to be authenticated, such as a 3 by 3 grid, a 3 by 4 grid, a 4 by 4 grid, etc. The present disclosure mainly uses a 3 by 3 grid as an example for explanation, and the other diagram patterns can be achieved by referring it.

Figure 3:
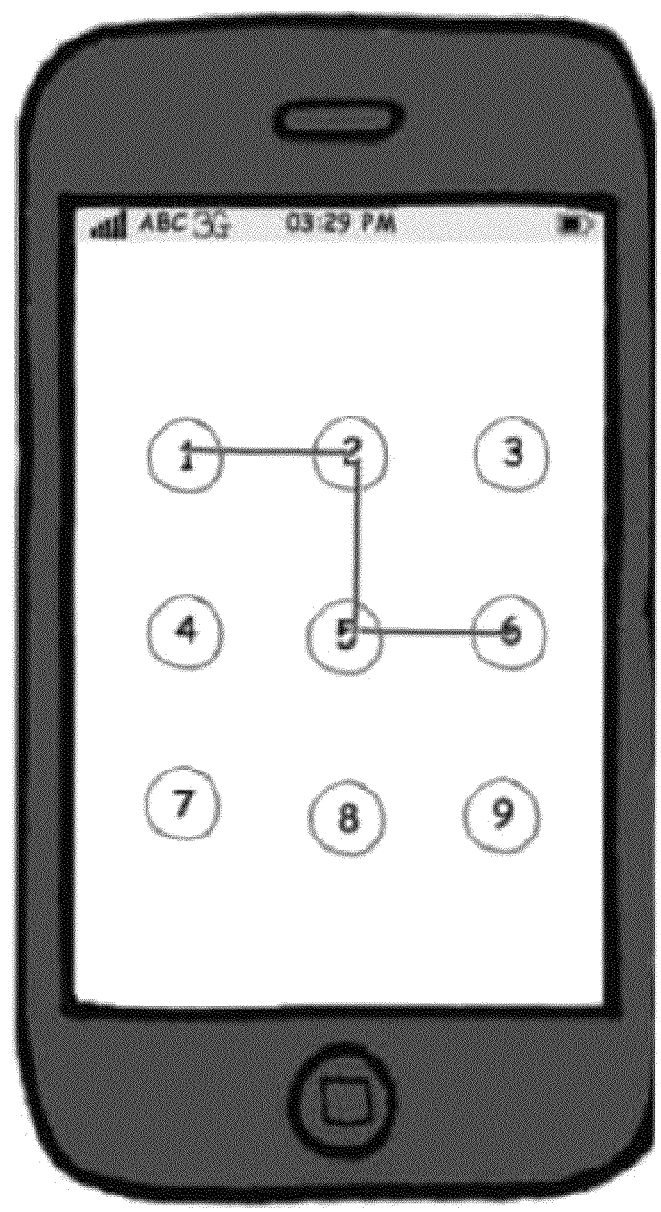
FIG. 3 is a schematic view illustrating a first folded line displayed in a 3 by 3 grid on a mobile device terminal.

FIG. 3 is a schematic view illustrating a first folded line displayed in a 3 by 3 grid on a mobile device terminal. A screen of the mobile device terminal displays a 3 by 3 grid and a folded line. Different angles in the folded line and the diagram operand points thereof are calculated based on an algorithm in which the folded line is changed every 30 seconds. The folded line of FIG. 3 passes through the diagram operand points of 1, 2, 5, and 6. Accordingly, a user needs to connect the four diagram operand points of 1, 2, 5, and 6 with a single stroke in 30 seconds of the effect time period on a page of password authentication in the second terminal.

Figure 4:
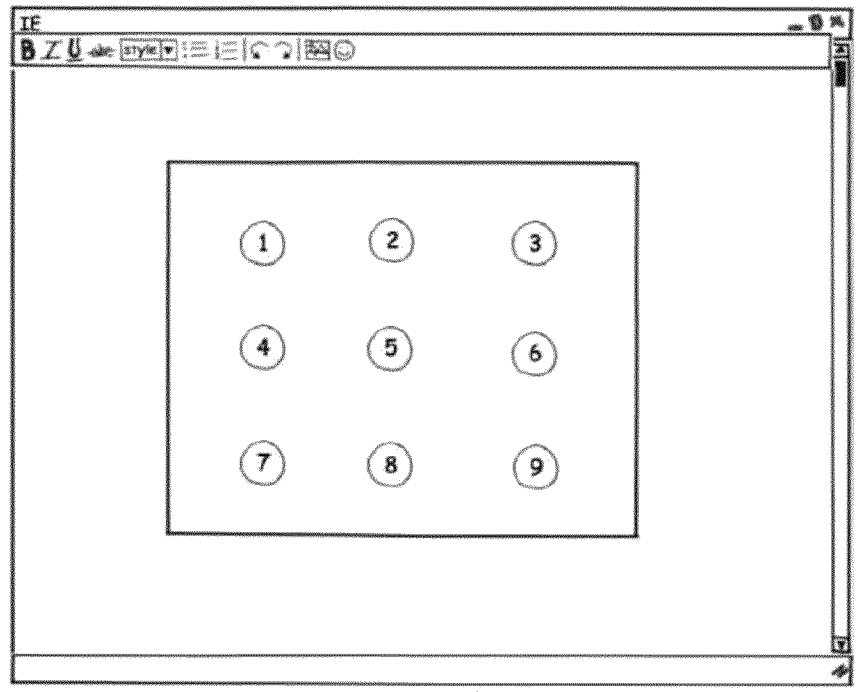
FIG. 4 is a schematic view illustrating a second folded line inputted in a 3 by 3 grid on a computer terminal.

FIG. 4 is a schematic view illustrating a second folded line inputted in a 3 by 3 grid on a computer terminal. As illustrated in FIG. 4, the page of password authentication is a webpage. The page has nine diagram operand points as well. A user needs to check the folded line displayed on the mobile device terminal and to connect the operand points corresponding to the displayed folded line with a single stroke and to submit it, and then the server terminal determines whether the authentication is passed.

Figure 5:
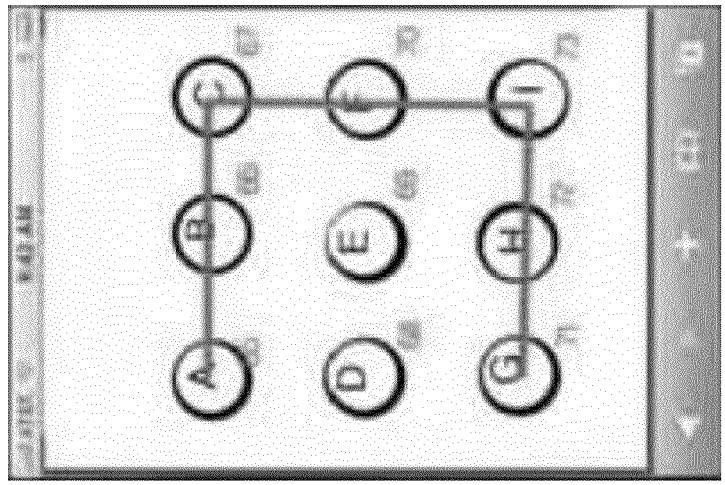
FIG. 5 illustrates schematic views illustrating a first folded line of a 3 by 3 grid that is dynamic displayed with time effectiveness of a password on a mobile device terminal.
Figure 5:
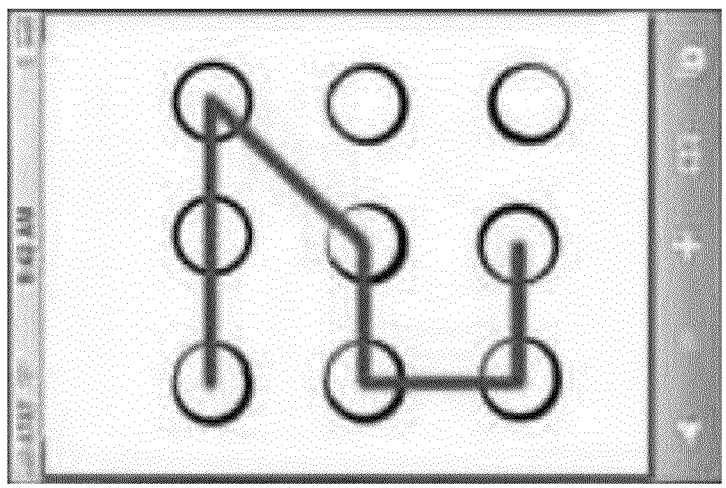

Since a password is of time effectiveness, the first terminal will dynamically display the first folded line with the time effectiveness of the password. FIG. 5 illustrates schematic views illustrating a first folded line of a 3 by 3 grid that is dynamically displayed with time effectiveness of a password on a mobile device terminal. Assuming that the effective time period of the OTP is 30 seconds, the effective time period that the folded line displayed in FIG. 4 is also 30 seconds for sake of security reason.

Figure 6:
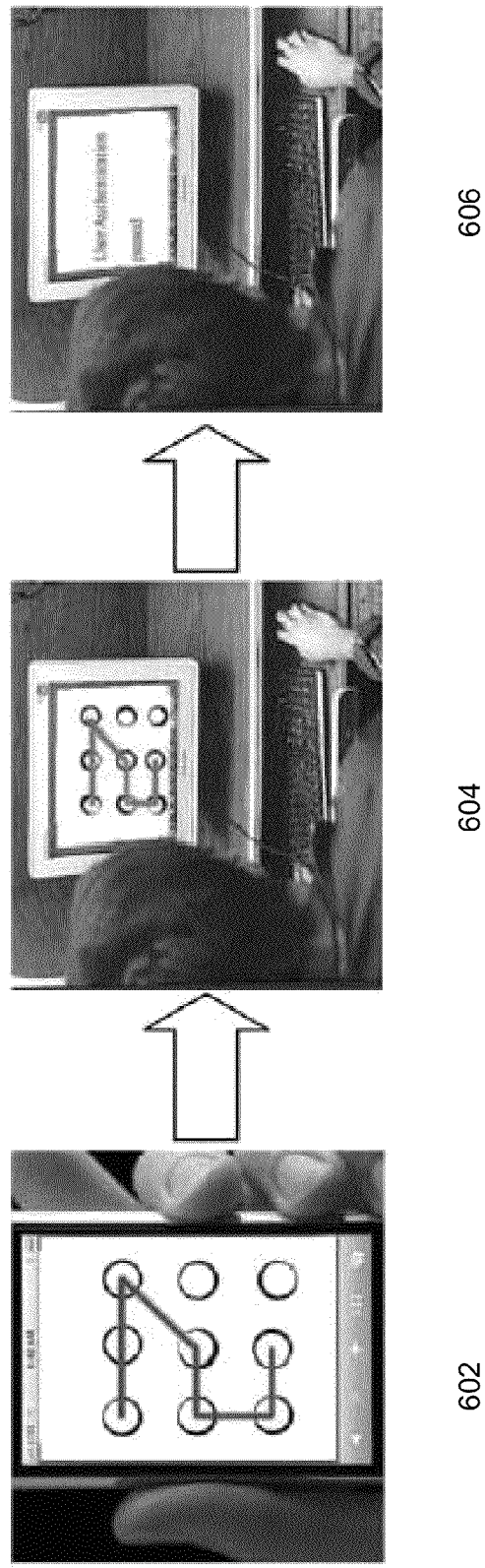
FIG. 6 illustrates schematic views illustrating a process employed for password authentication.

FIG. 6 illustrates schematic views illustrating a process employed for password authentication. At 602, a computing device may enable a user to view a first diagram in form of 3 by 3 grid by opening a dynamic gesture password program on a mobile device terminal. At 604, the user draws a second diagram by imitating the first diagram of the mobile device terminal on a page of password authentication right after the page of password authentication in form of a 3 by 3 grid is displayed while the user is in a computer terminal and is in a process of authentication for business employment. At 606, the computing device may enable a user terminal for the process of authentication to sending operand points that have been passed through by the second diagram to a server terminal for password authentication, and to receive a result of password authentication from the server terminal. If the authentication is passed, the user will be allowed to continue to following operations. If the authentication is not passed, the user will not be allowed to continue to following operations.

The present disclosure has advantages over the conventional techniques because a password in a form of a diagram is easier for memorization and accuracy of password authentication is thus improved. In addition, length of a digital number and the number are not easy to be memorized and are subject to typographical errors while a diagram is easier to be memorized as compared with a digital number.

In some embodiments, each of the first diagram and the second diagram is a diagram of one folded line. As compared with the prior art, the user of the present disclosure is able to input a second diagram with one single stroke on the user terminal so as to improve an input efficiency of authentication certificate for the user terminal and thus to improve the efficiency of password authentication.

In some embodiments, the computing device may further encrypt the operand points passed through by the second diagram by means of applying a front end script technology. The computing device may also enable the user terminal to transfer the operand points passed through by the second diagram to the server terminal for password authentication.

In some embodiments, a front end script technology of JavaScript, jQuery, FLASH, etc., can be applied on a webpage to encrypt the authentication certificate of the diagram pattern that is inputted by a user before the authentication certificate is sent to the server terminal. Since the authentication certificate received by the user has been encrypted, as compared with the prior art, the present disclosure can further prevent the risk of the fake authentication certificate to thus improve the password authentication security.

In some embodiments, the diagram operand points corresponding to characters of the second password are grabbed by enabling a user terminal to retrieve the diagram operand points corresponding to the characters of the second password, and sending the grabbed diagram operand points to the server terminal, or by enabling a server terminal to retrieve the diagram operand points corresponding to the characters of the second password.

In some embodiments, the diagram operand points corresponding to the characters of the second password are grabbed by selecting a diagram starting point as a diagram operand point corresponding to a first character of the second password, and by retrieving the diagram operand point corresponding to a continuing character of the second password, in accordance with a predetermined direction of the current diagram operand point in correspondence with the current character of the second password.

It should be noted that, in the embodiments of the present invention, the diagram operand point is for representing a diagram identifier in a diagram pattern for providing a user with a convenient drawing of the second diagram imitated from the first diagram.

Figure 7:
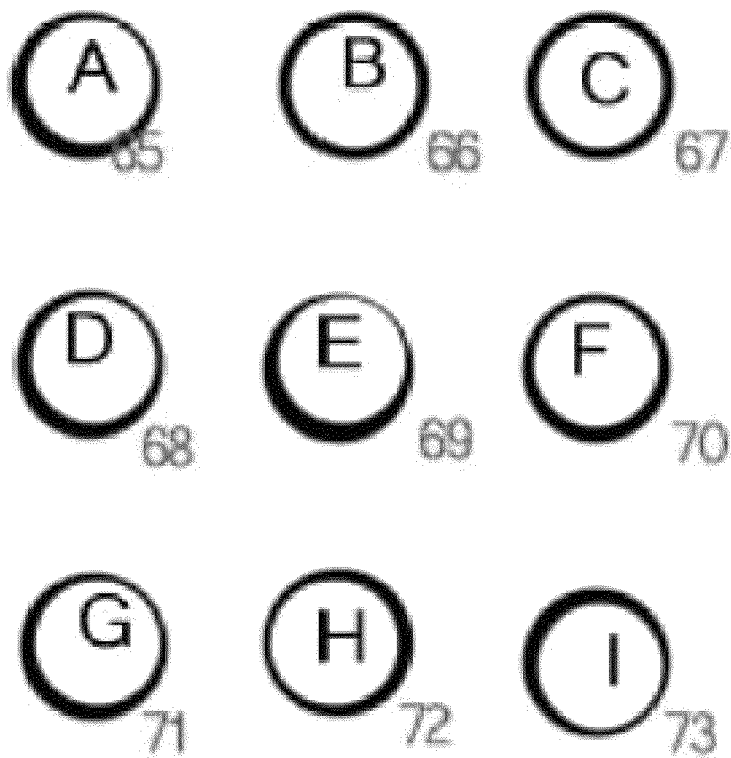
FIG. 7 is an enlarged view illustrating a 3 by 3 grid.

In some embodiments, the diagram operand points may be filled with numbers or letters. For example, FIG. 3 and FIG. 4 show an example of a 3 by 3 grid with a digital form of operand points. FIG. 5 shows an example of a 3 by 3 grid with an alphabetical form of operand points. FIG. 7 is an enlarged view illustrating a 3 by 3 grid. For a detailed description of diagram pattern, as referring to FIG. 7, it shows an enlarged view of one kind of the 3 by 3 grid in which it consists of A, B, C, D, E, F, G, H, I where each letter corresponds to one operand point.

In some embodiments, a starting point of the folded line is selected from an operand point of "E" in the middle, and the diagram operand points corresponding to a continuing character of the password are grabbed in accordance with a direction between the adjacent diagram operand points. Assuming that the password is "567890", the "5" is corresponding to the diagram operand point of "E", so the predetermined direction of "E" is needed to be determined.

According to the regularity of the diagram pattern, the predetermined directions may comprise directions of east, south, west, north, southeast, northeast, southeast and northwest. Assuming that the eight directions are respectively corresponding to eight digital numbers (i.e., 0-7). As an example, the explanation below takes east=0, south=1, west=2, north=3, southeast=4, northeast=5, southeast=6 and northwest=7 as their respective directional value. As digital numbers in total are 0-9 in a decimal system, a total amount of the directional values do not exceed 8 (e.g., 9). Therefore, a modularizing operating with a value of 8 (%8) in relation to current character should be processed, in which the result after the modularizing operation should not exceed 0-7, while the predetermined direction of the current diagram operand point corresponding to the current character of the password is determined.

In some embodiments, the predetermined direction of the current diagram operand point corresponding to the current character of the second password is determined by processing a first modularizing operation in relation to the second password and by configure a predetermined direction corresponding to a result of the first modularizing operation as a predetermined direction of the current diagram operand point corresponding to the current character of the second password. In these instances, the predetermined direction may specially include directions comprising directions of east, south, west, north, southeast, northeast, southeast and northwest. The first modularizing operation is to be aimed at the value of 8 for modularizing operation. In some instances, 5%8=5 indicates that the line should go toward the direction of "northeast", and in other word, the next character "6" is corresponding to the diagram operand point of "C".

In some embodiments, each of the first diagram and the second diagram can be a diagram of a folded line. As compared with the prior art that it needs to input several password characters in several input fields sequentially, the present disclosure enables a user to input a second diagram with one single stroke on the user terminal to thus improve an input efficiency of authentication certificate for the user terminal and improve the efficiency of password authentication.

Since each character in the second password is different from each other. For example, the diagram operand points corresponding to the characters of the second password are different, and the diagram operand points of the characters of the folded line should be different in order to obtain a folded line with one single stroke. However, according to the study, it is found that the predetermined direction may encounter a boundary hitting or be in repetition status. The current diagram operand point may encounter a dead end, and that is not allowable. Hereinafter, the boundary hitting, the repetition, and the dead end will be described.

The boundary hitting, for example, for the operand point of "C", is not allowed to go toward a direction of up and right; so it encounters the "boundary hitting".

Figure 8:
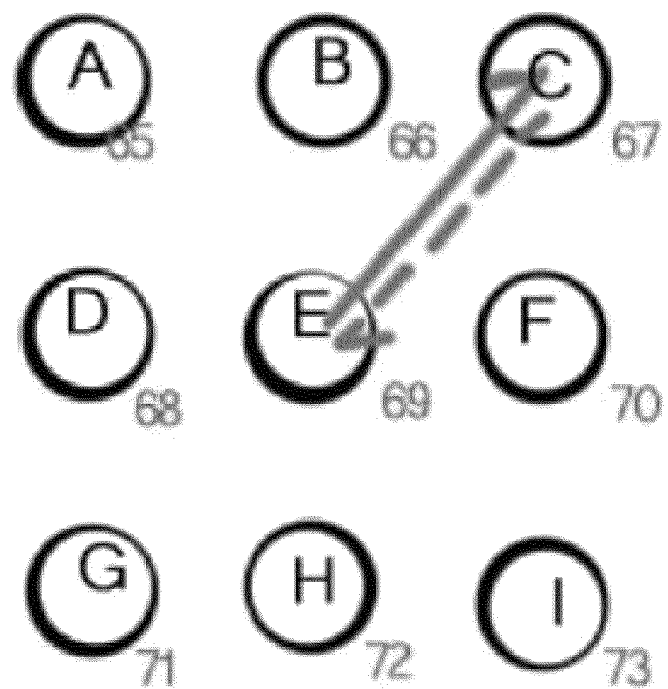
FIG. 8 is a schematic view illustrating a folded line in a 3 by 3 grid.

FIG. 8 is a schematic view illustrating a folded line in a 3 by 3 grid. The repetition, as illustrated in FIG. 8, illustrates a folded line in a 3 by 3 grid. Assuming there is a line crossing over from E to C; however, the direction pointed out by the next number is intending to go toward a direction of southwest (i.e. from C to E). The repetition is not allowed.

The dead end, assuming that the E, F, H, I, is sequentially connected with a single stroke. Here, "I" is not allowed to go toward any direction because there is a boundary hitting on directions of east and south and the operand points of H, E, F have been passed through which causes that these operand points cannot be passed through again; there is a dead end in spite that there are still some other operand points that have not been passed through.

In some embodiments, to avoid any occurrence of the boundary hitting, the repetition, and the dead end to improve input efficiency of authentication certificate for the user terminal, a computing device may determine whether a dead end is encountered using various methods. For example, the computing device may end the drawing of a line and display a result of the drawn line if the dead end is encountered. If the dead end is not encountered yet, the computing device may then determine whether the boundary hitting is encountered or whether it is in repetition. If the boundary hitting is encountered or it is in repetition, the current character is updated such as a processing of +1, and a new predetermined direction is obtained by processing the first modularizing operation again and performing a determination again. If the boundary hitting is still encountered or it is still in repetition, the computing device may continue to repeat the above processes until a direction that is allowed to go forward is found. The computing device may ensure the existence of at least one direction allowable since the dead end is not encountered.

For example, the second number of "567890" is "6", the operation of 6%8=6 indicates a direction of "southwest" determined. However, the operand point of "E" that is reached following the direction of "southwest" found connected; so a repetition occurs. As a result, 1 may be added to the original number of "6" to obtain 7, and then the operation of %8 may be performed again to obtain a value of 7 corresponding to a direction of northwest. The computing device concludes that the operand point of "C" should go toward in a direction of northwest, but it determines that a boundary hitting is encountered in the direction of northwest. Since it is not allowed to go toward in the direction of northwest, the computing device needs to add 1 to the number again for processing the modularizing operation to find a direction that is allowed to go forward for continuing the drawing of the line.

In some embodiments, the retrieving the diagram operand point corresponding to a continuing character of the second password in accordance with a predetermined direction of the current diagram operand point in correspondence with the current character of the second password may further comprise ending retrieving of diagram operand point corresponding to the continuing character of the second password, when the current diagram operand point corresponding to the current character of the second password encounters a dead end.

In some embodiments, the retrieving the diagram operand point corresponding to a continuing character of the second password, in accordance with a predetermined direction of the current diagram operand point in correspondence with the current character of the second password may further comprise processing updating of the current character of the second password, when the current diagram operand point corresponding to the current character of the second password does not encounter a dead end and the predetermined direction of the current diagram operand point encounters a boundary hitting or is in repetition, and determining a predetermined direction in correspondence with the diagram operand point of the updated current character of the password.

In some embodiments, the retrieving the diagram operand point corresponding to a continuing character of the second password, in accordance with a predetermined direction of the current diagram operand point in correspondence with the current character of the second password, may further comprise configuring a diagram operand point corresponding to the predetermined direction of the current operand point as a diagram operand point corresponding to the continuing character of the second password when the current diagram operand point corresponding to the current character of the second password does not encounter a dead end and the predetermined direction of the current diagram operand point does not encounter a boundary hitting or is in repetition.

In some embodiments, a determination that the current diagram operand point corresponding to the current character of the second password is encountering a dead end is determined by determining the current diagram operand point corresponding to the current character of the second password as encountering a dead end, if the predetermined direction of the current diagram operand point corresponding to the current character of the second password encounters a wall-hitting, and the diagram operand point corresponding to other predetermined direction is the same as a diagram operand point corresponding to the obtained character of the password.

In some embodiments, determining determination that the predetermined direction of the current diagram operand point corresponding to the current character of the password as encountering a repetition may be determined by determining the predetermined direction of the current diagram operand point corresponding to the current character of the password as encountering a repetition, when a diagram operand point of the predetermined direction of the current diagram operand point corresponding to the current character of the second password is the same as the diagram operand point corresponding to the obtained character of the second password.

In some embodiments, the diagram operand point is associated with a corresponding value and the predetermined direction is with a corresponding hitting value. In these instances, a determination that the current diagram operand point corresponding to the current character of the second password has encountered a dead end is processed by summing up a value of the current diagram operand point corresponding to the current character of the second password and a value of the corresponding predetermined direction, and determining the predetermined direction of the current diagram operand point corresponding to current character of the second password as encountering a wall-hitting with respect to an upper boundary and a lower boundary if the summing up result is not a value within a scope of all diagram operand points in a diagram pattern, and/or by processing a second modularizing operating in relation to a value of the current diagram operand point corresponding to the current character of the second password, and determining the predetermined direction of the current diagram operand point corresponding to the current character of the second password as encountering a wall-hitting with respect to a left boundary and a right boundary if the predetermined direction of the current diagram operand point corresponding to the current character of the second password matches with a pre-configured hitting value of the second modularizing operation result.

In some embodiments, a value of ASCII code can be used for representing the corresponding value of a diagram operand point, such as the ASCII values of 65, 66, 67, 68, 69, 70, 71, 72, 73 respectively represent the operand points of A, B, C, D, E, F, G, H, I.

As mentioned above, the drawing of a line is a process of movement with respect to directions, and the directional movement is obtained by transforming the character of the password to a predetermined direction. The regulation thereof can be obtained by the match between a value and a predetermined direction, such as an upper movement corresponding to "−3", an upper left movement corresponding to "−4", a left movement corresponding to "−1", a lower left movement corresponding to "+2", a lower movement corresponding to "+3", a lower right movement corresponding to "+4", a right movement corresponding to "+1", and an upper right movement corresponding to "−2".

If a second modularizing operation (%3) is processed in relation to each column in a 3 by 3 grid, the results of the second modularizing operation for each column will be different. For example, the result of the second modularizing operation for 65\68\71 in the first column is 2, the result of the second modularizing operation for 66\69\72 in the second column is 0, and the result of the second modularizing operation for 67\70\73 in the third column is 1.

According to the above regulation, the wall-hitting with respect to an upper boundary and a lower boundary can be determined as follows. A value of a diagram operand point corresponding to a continuing character cannot be less than 65 or larger than 73. If the regulation is violated, the computing device may consider encountering a wall-hitting with respect to an upper boundary or a lower boundary. Thereafter, a summing up procedure may be operated with respect to a value of the current diagram operand point corresponding to the current character of the second password and a value of the corresponding predetermined direction to obtain a value of the diagram operand point.

For an operand point in a first column of the 3 by 3 grid, whose value is 2 after being modularized by 3, the regulation is that it is not allowed to go toward a direction of upper left (−4), left (−1), of left (−1), or of lower left (+2). If the regulation is violated, it will encounter a wall-hitting with respect to a left boundary.

For an operand point in a third column of the 3 by 3 grid, whose value is 1 after being modularized by 3, the regulation is that it is not allowed to go toward a direction of upper right (−2), of right (+1), or of lower right (+4). If the regulation is violated, it will encounter a wall-hitting with respect to a right boundary.

In conclusion, once the process encounters a boundary hitting or is in repetition, the process may update the current character and determine a predetermined direction in correspondence with the diagram operand point of the updated current character. In other words, the computing device obtains a diagram that can be drawn with one single stroke by means of preventing the boundary hitting and the repetition. That a user can input a second diagram with one single stroke on the user terminal is a matter for improving an input efficiency of authentication certificate for the user terminal and thus to improve the efficiency of password authentication.

Figure 9:
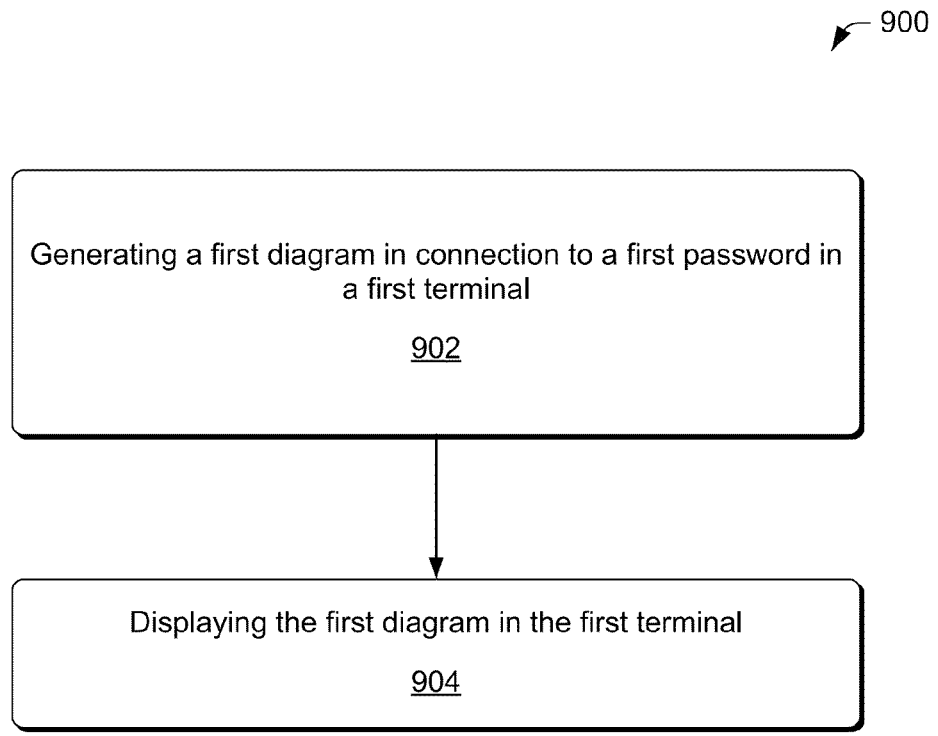
FIG. 9 is a flow chart illustrating a method for displaying a password in a terminal.

FIG. 9 is a flow chart illustrating a method for displaying a password in a terminal. At 902, a computing device may generate a first diagram in connection to a first password in a first terminal. At 904, the computing device may display the first diagram in the first terminal.

In some embodiments, the first diagram is a diagram of a folded line, and the first diagram is a diagram of s folded line with a single stroke.

In some embodiments, the generating a first diagram in connection to a first password in a first terminal further comprises retrieving diagram operand points corresponding to characters of the first password, and connecting diagram operand points corresponding to characters of the first password in sequence in the first terminal to obtain a first diagram.

It should be noted that a single scheme can be used for retrieving the diagram operand points corresponding to the characters of the passwords by the server terminals of the first terminal and the second terminal, in which the first password and the second password synchronously exist so that the diagram operand points corresponding to the characters of first password and the second password grabbed by the first terminal and the second terminal are the same.

In some embodiments, the diagram operand points corresponding to characters of the first password are grabbed by selecting a diagram starting point as a diagram operand point corresponding to a first character of the first password; and retrieving the diagram operand point corresponding to a continuing character of the first password, in accordance with a predetermined direction of the current diagram operand point in correspondence with the current character of the first password.

In some embodiments, the retrieving the diagram operand point corresponding to a continuing character of the first password, in accordance with a predetermined direction of the current diagram operand point in correspondence with the current character of the first password further comprises ending retrieving of diagram operand point corresponding to the continuing character of the first password, when the current diagram operand point corresponding to the current character of the first password encounters a dead end.

In some embodiments, the retrieving the diagram operand point corresponding to a continuing character of the first password, in accordance with a predetermined direction of the current diagram operand point in correspondence with the current character of the first password further comprises processing updating for the current character of the first password, when the current diagram operand point corresponding to the current character of the first password does not encounter a dead end and the predetermined direction of the current diagram operand point encounters a boundary hitting or a repetition, and determining a predetermined direction in correspondence with the diagram operand point of the updated current character of the password.

In some embodiments, the retrieving the diagram operand point corresponding to a continuing character of the first password, in accordance with a predetermined direction of the current diagram operand point in correspondence with the current character of the first password comprises configuring a diagram operand point corresponding to the predetermined direction of the current operand point as a diagram operand point corresponding to the continuing character of the first password.

In some embodiments, the predetermined direction of the current diagram operand point corresponding to the current character of the first password is determined by processing a first modularizing operation in relation to the first password, and configuring a predetermined direction corresponding to a result of the first modularizing operation as a predetermined direction of the current diagram operand point corresponding to the current character of the first password, wherein the predetermined direction is selected from directions comprising directions of east, south, west, north, southeast, northeast, southeast and northwest.

In some embodiments, the current diagram operand point corresponding to the current character of the first password is determined as encountering a dead end is determined by determining the current diagram operand point corresponding to the current character of the first password as encountering a dead end, if the predetermined direction of the current diagram operand point corresponding to the current character of the first password encounters a wall-hitting, and the diagram operand point corresponding to other predetermined direction is the same as a diagram operand point corresponding to the obtained character of the first password.

In some embodiments, the diagram operand point has a corresponding value and the predetermined direction has a corresponding hitting value. In these instances, the determining the current diagram operand point corresponding to the current character of the first password as encountering a dead end is processed by summing up a value of the current diagram operand point corresponding to the current character of the first password and a value of the corresponding predetermined direction, and determining the predetermined direction of the current diagram operand point corresponding to current character of the first password as encountering a wall-hitting with respect to an upper boundary and a lower boundary if the summing up result is not a value within a scope of all diagram operand points in a diagram pattern, and/or by processing a second modularizing operating in relation to a value of the current diagram operand point corresponding to the current character of the first password, and determining the predetermined direction of the current diagram operand point corresponding to the current character of the first password as encountering a wall-hitting with respect to a left boundary and a right boundary if the predetermined direction of the current diagram operand point corresponding to the current character of the first password matches with a pre-configured hitting value of the second modularizing operation result.

In some embodiments, determining that the predetermined direction of the current diagram operand point corresponding to the current character of the first password as encountering a repetition is determined by determining the predetermined direction of the current diagram operand point corresponding to the current character of the first password as encountering a repetition, when a diagram operand point of the predetermined direction of the current diagram operand point corresponding to the current character of the first password is the same as the diagram operand point corresponding to the obtained character of the first password.

Figure 10:
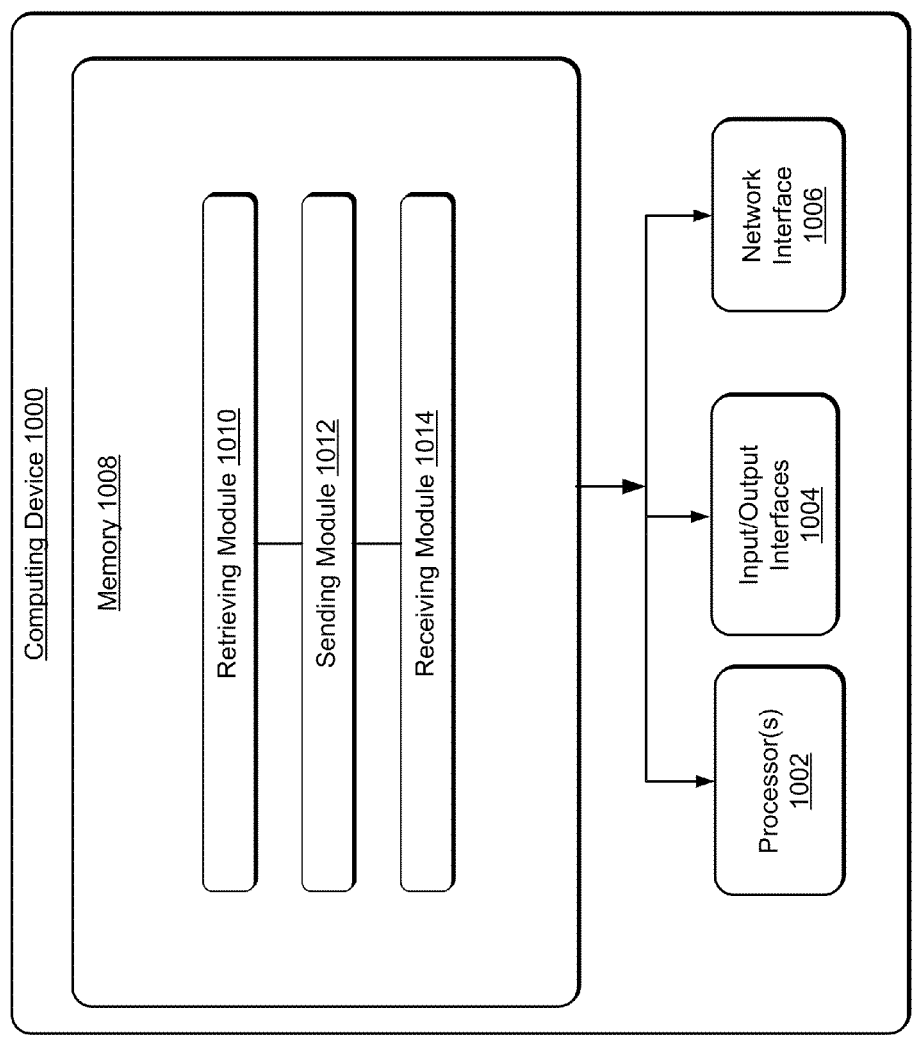
FIG. 10 is a block diagram illustrating a user terminal for authentication password.
Figure 11:
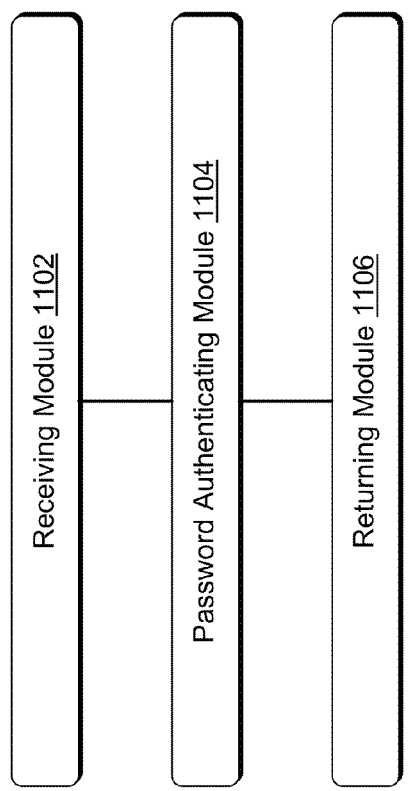
FIG. 11 is a block diagram illustrating a server terminal for authentication password authentication.
Figure 12:
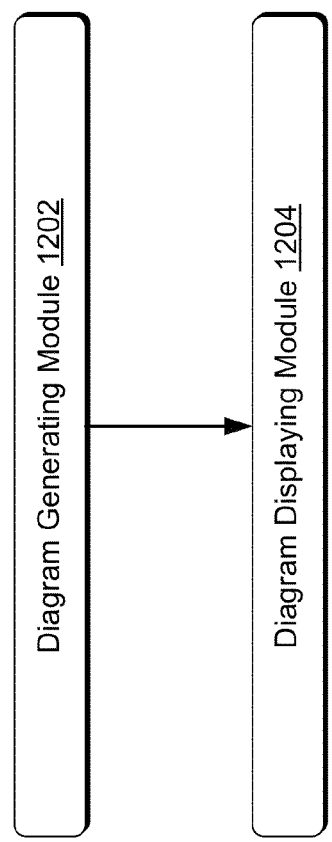
FIG. 12 is a block diagram illustrating a terminal password system.

FIGS. 10-12 are schematic diagrams of illustrative computing architectures that enable password authentication. FIG. 10 is a block diagram illustrating a user terminal (e.g., a computing device 1000) for authentication password. The computing device 1000 may be a user device or a server for password authentication. In one exemplary configuration, the computing device 1000 includes one or more processors 1002, input/output interfaces 1004, network interface 1006, and memory 1008.

The memory 1008 may include computer-readable media in the form of volatile memory, such as random-access memory (RAM) and/or non-volatile memory, such as read only memory (ROM) or flash RAM. The memory 1008 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 1008 in more detail, the memory 1008 may include a retrieving module 1010, a sending module 1012, and a receiving module 1014. The retrieving module 1010 may be configured to retrieve a second diagram that is inputted by a user in a second terminal, wherein the second diagram is imitated from a first diagram, which is generated in a first terminal and is displayed in form of a diagram in connection to a first password. The sending module 1012 may be configured to transfer operand points that have been passed through by the second diagram to a server terminal for password authentication. The receiving module 1014 may be configured to receive a result of password authentication from the server terminal.

In some embodiments, the first password is obtained by a first terminal in accordance with a password algorithm, or the first password is obtained by the server terminal of the second terminal based on a password algorithm before it is sent to the first terminal.

In some embodiments, the memory 1008 further includes an encryption module configured to encrypt the operand points been passed through by the second diagram by means of applying a front end script technology. In these instances, the sending module 1012 may enable the user terminal to send the operand points that have been passed through by the second diagram to the server terminal for password authentication.

In some embodiments, each of the first diagram and the second diagram is a diagram of folded line.

FIG. 11 is a block diagram illustrating a server terminal for authentication password authentication. The memory associated with the server terminal may include a receiving module 1102, a password authenticating module 1104, and a returning module 1106. The receiving module 1102 may be configured to receive, from the user terminal, operand points been passed through by the second diagram. The password authentication module 1104 may be configured to execute password authentication in the server terminal by comparing the operand points that have been passed through by the second diagram and diagram operand points corresponding to characters of a second password, wherein the second diagram is imitated from the first diagram, the first diagram is generated in the first terminal and is displayed with a diagram in connection to the first password, and the first password and the second password are synchronously existing. The returning module 1106 may be configured to return a result of password authentication to the user terminal.

In some embodiments, the memory may further include a diagram operand point retrieving module configured to retrieve a diagram operand point corresponding to the character of the second password. In these instances, the diagram operand point retrieving module may include an operand point corresponding to the first character retrieving modularizing for selecting a diagram starting point as a diagram operand point corresponding to a first character of the second password. The diagram operand point retrieving module may also include an operand point corresponding to a continuing character retrieving modularizing for retrieving the diagram operand point corresponding to a continuing character of the second password, in accordance with a predetermined direction of the current diagram operand point in correspondence with the current character of the second password.

In some embodiments, the operand point corresponding to a continuing character retrieving module may further include an ending sub-modularizing module configured to stop the retrieving of diagram operand point corresponding to the continuing character of the second password, when the current diagram operand point corresponding to the current character of the second password encounters a dead end.

In some embodiments, the operand point corresponding to a continuing character retrieving module may further include an exception handling sub-modularizing module configured to process updating of the current character of the second password, when the current diagram operand point corresponding to the current character of the second password does not encounter a dead end and the predetermined direction of the current diagram operand point encounters a boundary hitting or is in repetition and for determining a predetermined direction in correspondence with the diagram operand point of the updated current character of the password.

In some embodiments, the operand point corresponding to a continuing character retrieving module may further include a normal processing sub-modularizing module configured to configure a diagram operand point corresponding to the predetermined direction of the current operand point as a diagram operand point corresponding to the continuing character of the second password when the current diagram operand point corresponding to the current character of the second password encounters a dead end and the predetermined direction of the current diagram operand point does not encounter a boundary hitting or is in repetition.

In some embodiments, the memory may include a predetermined direction determining module configured to process a first modularizing operation in relation to the second password and for configure a predetermined direction corresponding to a result of the first modularizing operation as a predetermined direction of the current diagram operand point corresponding to the current character of the second password, wherein the predetermined direction is selected from directions comprising directions of east, south, west, north, southeast, northeast, southeast and northwest.

In some embodiments, the memory may include a dead end determining module configured to store the current diagram operand point corresponding to the current character of the second password is encountering a dead end. In these instances, the determining process may include determining the current diagram operand point corresponding to the current character of the second password as encountering a dead end, if the predetermined direction of the current diagram operand point corresponding to the current character of the second password encounters a wall-hitting, and the diagram operand point corresponding to other predetermined direction is the same as a diagram operand point corresponding to the obtained character of the password.

In some embodiments, the diagram operand point may be associated with a corresponding value and the predetermined direction is with a corresponding hitting value. In these instances, the memory may include a wall-hitting determining module configured to determine the current diagram operand point corresponding to the current character of the second password as encountering a dead end. The wall-hitting determining module may include an upper boundary and lower boundary determining modularizing module configured to sum up a value of the current diagram operand point corresponding to the current character of the second password and a value of the corresponding predetermined direction, and determining the predetermined direction of the current diagram operand point corresponding to current character of the second password as encountering a wall-hitting with respect to an upper boundary and a lower boundary if the summing up result is not a value within a scope of all diagram operand points in a diagram pattern. In some embodiments, the wall-hitting determining module may include a left boundary and right boundary determining modularizing module configured to process a second modularizing operating in relation to a value of the current diagram operand point corresponding to the current character of the second password, and determining the predetermined direction of the current diagram operand point corresponding to the current character of the second password as encountering a wall-hitting with respect to a left boundary and a right boundary if the predetermined direction of the current diagram operand point corresponding to the current character of the second password matches with a pre-configured hitting value of the second modularizing operation result.

In some embodiments, the memory may include a repetition determining module configured to determine the predetermined direction of the current diagram operand point corresponding to the current character of the password as encountering a repetition, the determining process may include: determining the predetermined direction of the current diagram operand point corresponding to the current character of the password as encountering a repetition, when a diagram operand point of the predetermined direction of the current diagram operand point corresponding to the current character of the second password is the same as the diagram operand point corresponding to the obtained character of the second password.

It should be noted that the diagram operand point retrieving module for retrieving a diagram operand point corresponding to the character of the second password may be located on the user terminal for password authentication, and thus the user terminal for password authentication is retrieving the diagram operand point corresponding to the character of the second password before it sends the diagram operand point to the server terminal for password authentication.

FIG. 12 is a block diagram illustrating a terminal password system. Memory associated with the terminal password system may include a diagram generating module 1202 configured to generate a first diagram in connection to a first password in a first terminal, and a diagram displaying module 1204 configured to display the first diagram in the first terminal.

In some embodiments, the diagram generating module 1202 may further include an operand points retrieving modularizing module configured to retrieve diagram operand points corresponding to characters of the first password, and a connecting modularizing module configured to connect diagram operand points corresponding to characters of the first password sequentially in the first terminal to obtain a first diagram.

In some embodiments, the operand points retrieving modularizing module may further include an operand point corresponding to the first character retrieving modularizing for selecting a diagram starting point as a diagram operand point corresponding to a first character of the first password, and an operand point corresponding to a continuing character retrieving modularizing for retrieving the diagram operand point corresponding to a continuing character of the first password, in accordance with a predetermined direction of the current diagram operand point in correspondence with the current character of the second password.

In some embodiments, the operand point corresponding to a continuing character retrieving module may further include an ending sub-modularizing module configured to stop retrieving of diagram operand point corresponding to the continuing character of the first password, when the current diagram operand point corresponding to the current character of the first password encounters a dead end.

In some embodiments, the operand point corresponding to a continuing character retrieving module may further include an exception handling sub-modularizing module configured to process updating of the current character of the first password, when the current diagram operand point corresponding to the current character of the first password does not encounter a dead end and the predetermined direction of the current diagram operand point encounters a boundary hitting or is in repetition and for determining a predetermined direction in correspondence with the diagram operand point of the updated current character of the first password.

In some embodiments, the operand point corresponding to a continuing character retrieving module may further include a normal processing sub-modularizing module configured to configure a diagram operand point corresponding to the predetermined direction of the current operand point as a diagram operand point corresponding to the continuing character of the first password when the current diagram operand point corresponding to the current character of the first password encounters a dead end and the predetermined direction of the current diagram operand point does not encounter a boundary hitting or is in repetition.

In some embodiments, the memory may include a predetermined direction determining module configured to process a first modularizing operation in relation to the first password and for configure a predetermined direction corresponding to a result of the first modularizing operation as a predetermined direction of the current diagram operand point corresponding to the current character of the first password, wherein the predetermined direction is selected from directions comprising directions of east, south, west, north, southeast, northeast, southeast and northwest.

In some embodiments, the memory may include a dead end determining module for the current diagram operand point corresponding to the current character of the first password is encountering a dead end. In these instances, the determining process may include determining the current diagram operand point corresponding to the current character of the first password as encountering a dead end, if the predetermined direction of the current diagram operand point corresponding to the current character of the first password encounters a wall-hitting, and the diagram operand point corresponding to other predetermined direction is the same as a diagram operand point corresponding to the obtained character of the password.

In some embodiments, the diagram operand point may be associated with a corresponding value and the predetermined direction is with a corresponding hitting value. In these instances, the memory may include a wall-hitting determining module configured to determine the current diagram operand point corresponding to the current character of the first password as encountering a dead end. The wall-hitting determining module may also include an upper boundary and lower boundary determining modularizing module configured to sum up a value of the current diagram operand point corresponding to the current character of the first password and a value of the corresponding predetermined direction, and determining the predetermined direction of the current diagram operand point corresponding to current character of the first password as encountering a wall-hitting with respect to an upper boundary and a lower boundary if the summing up result is not a value within a scope of all diagram operand points in a diagram pattern. The wall-hitting determining module may include a left boundary and right boundary determining modularizing module configured to process a second modularizing operating in relation to a value of the current diagram operand point corresponding to the current character of the first password, and determining the predetermined direction of the current diagram operand point corresponding to the current character of the first password as encountering a wall-hitting with respect to a left boundary and a right boundary if the predetermined direction of the current diagram operand point corresponding to the current character of the first password matches with a pre-configured hitting value of the second modularizing operation result.

In some embodiments, the memory may include a repetition determining module for determining the predetermined direction of the current diagram operand point corresponding to the current character of the password as encountering a repetition. In these instances, the determining process may include determining the predetermined direction of the current diagram operand point corresponding to the current character of the password as encountering a repetition, when a diagram operand point of the predetermined direction of the current diagram operand point corresponding to the current character of the first password is the same as the diagram operand point corresponding to the obtained character of the first password.

Persons skilled in the art should understand that the embodiments of the present disclosure can be achieved as a method, a system, or a computer program product. Therefore, the present disclosure may be implemented in form of embodiments as an entire hardware, entire software, or a combination of the software and the hardware. Furthermore, the present disclosure may be implemented in form of one or more computer program product that is implemented in computer readable storage media, including but not limited to a disk memory, a CD-ROM, an optical memory, containing computer readable code.

The present disclosure is described with reference to the flowchart and/or the block diagrams of the methods, the apparatus, the systems, and the computer programming product according to the embodiments of the present invention. It should be understood that the flowchart and/or the block diagram of each process and the combination thereof can be achieved by the computer programming instructions. These computer programming instructions can be provided to a universal computer, a dedicated computer, an embedded processor, or other programmable data processing apparatus to produce a machine processor, so that the specified functions of one or more processing flow diagrams and/or the block diagrams can be achieved by the instructions executed in a computer or other programmable data processing apparatus.

These computer programming instructions can also be stored in a computer or other programmable data processing equipment for processing an execution in a particular way, so that a product including a instructing device can be generated by the instructions stored in the computer-readable memory, and the instructing device achieves the specified functions of one or more processing flow diagrams and/or the block diagrams.

These computer program instructions can also be loaded onto a computer or other programmable data processing equipment, so the computer or the other programmable data processing equipment can perform a series of steps for producing a computer implementable process in a manner that the instructions for achieving the steps of the specified functions of one or more processing flow diagrams and/or the block diagrams can be provided in a computer or other programmable apparatus.

Although embodiments of the present disclosure have been described, however once the basic inventive concepts of the present disclosure is learned by a person skilled in the art, these embodiments can be modified or changed. Therefore, the appended claims are intended to be interpreted as including the embodiments and all changes and modifications falling within the scope of the present application.

In this specification, the various embodiments are described as step by step, and the description in each embodiment is different from each other. The same portion or similar parts among the various embodiments can be referred to with each other.

The above provides a detailed description for a method for authentication a password, a user terminal for password authentication, a server terminal for password authentication, a method for displaying a password in a terminal, and a terminal password system of the present application, in which the embodied examples are described for explaining the theories and concrete implementation. The description of the embodiments is only for assisting people to understand the principle and its core concept. People with ordinary skill in the art are capable of changing the specific embodiments and a practical scope according to the concept of the present invention. Accordingly, the contents above should not be interpreted as a restriction to the present invention.

What is claimed is:

1. One or more computer-readable media storing computer-executable instructions that, when executed by one or more processors, instruct the one or more processors to perform acts comprising:
   receiving a diagram at a computing device, the diagram being inputted by a user to imitate an additional diagram that is generated at an additional computing device for authenticating a password;
   transferring operand points derived from the diagram to a server for password authentication, the password being authenticated by comparing the operand points derived from the diagram and operand points corresponding to characters of the password, wherein the operand points corresponding to characters of the password are obtained by:
      a diagram starting point as a diagram operand point corresponding to a character of the password; and
      retrieving a diagram operand point corresponding to a continuing character of the password based on a predetermined direction of the diagram operand point in correspondence with the character of the password, wherein
      ending the retrieving of the diagram operand point corresponding to the continuing character of the password in response to a determination that the diagram operand point corresponding to the character of the password encounters a dead end; or updating the character of the password in response to a determination that the diagram operand point corresponding to the character of the password does not encounter a dead end and the predetermined direction of the diagram operand point encounters a boundary hitting or is in a repetition, and determining a predetermined direction in correspondence with the diagram operand point of the updated character of the password; and receiving a result of the password authentication from the server.

2. The one or more computer-readable media of claim 1, wherein the password is obtained by the additional computing device using a password algorithm.

3. The one or more computer-readable media of claim 1, wherein the password is obtained by the server using a password algorithm.

4. The one or more computer-readable media of claim 1, wherein the acts further comprise encrypting the operand points using front end scripts.

5. The one or more computer-readable media of claim 1, wherein both of the diagram and the additional diagram include a diagram of a folded line.

6. A method for authenticating a password, comprising:
receiving, from a computing device, operand points derived from a diagram at a server including one or more processors;
comparing the operand points derived from the diagram and operand points corresponding to characters of a password, the diagram being inputted to imitate an additional diagram that is generated in an additional computing device in connection to an additional password, and the password and the additional password synchronously existing, wherein the operand points corresponding to characters of the password are obtained by:
a diagram starting point as a diagram operand point corresponding to a character of the password; and
retrieving a diagram operand point corresponding to a continuing character of the password based on a predetermined direction of the diagram operand point in correspondence with the character of the password, wherein
ending the retrieving of the diagram operand point corresponding to the continuing character of the password in response to a determination that the diagram operand point corresponding to the character of the password encounters a dead end; or
updating the character of the password in response to a determination that the diagram operand point corresponding to the character of the password does not encounter a dead end and the predetermined direction of the diagram operand point encounters a boundary hitting or is in a repetition, and
determining a predetermined direction in correspondence with the diagram operand point of the updated character of the password; and
transmitting a result of password authentication to the computing device.

7. The method of claim 6, wherein the operand points corresponding to characters of the password are obtained by the additional computing device using a password algorithm.

8. The method of claim 6, wherein the operand points corresponding to characters of the password are obtained by the server using a password algorithm.

9. The method as claimed in claim 6, wherein the predetermined direction of the diagram operand point corresponding to the character of the password is determined by:

processing a first modularizing operation in relation to the password; and
configuring a predetermined direction corresponding to a result of the first modularizing operation as a particular predetermined direction of the diagram operand point corresponding to the character of the password, the predetermined direction being selected from directions including directions of east, south, west, north, southeast, northeast, southeast and northwest.

10. The method as claimed in claim 6, wherein the diagram operand point corresponding to the character of the password is determined as encountering a dead end when the predetermined direction of the diagram operand point corresponding to the character of the password encounters a wall-hitting, and the diagram operand point corresponding to other predetermined direction is same as a diagram operand point corresponding to the character of the password.

11. The method of claim 6, wherein the diagram operand point is associated with a corresponding value and the predetermined direction is associated with a corresponding hitting value, and the determining the diagram operand point corresponding to the character of the password as encountering the dead end comprises:
summing up a value of the diagram operand point corresponding to the character of the password and a value of the corresponding predetermined direction, and determining the predetermined direction of the diagram operand point corresponding to the character of the password as encountering a wall-hitting with respect to an upper boundary and a lower boundary if the summing up result is not a value within a scope of all diagram operand points in a diagram pattern; or
processing a second modularizing operating in relation to a value of the diagram operand point corresponding to the character of the password, and determining the predetermined direction of the diagram operand point corresponding to the character of the password as encountering a wall-hitting with respect to a left boundary and a right boundary if the predetermined direction of the diagram operand point corresponding to the character of the password matches with a pre-configured hitting value of the second modularizing operation result.

12. The method of claim 6, wherein the determining the predetermined direction of the diagram operand point corresponding to the character of the password as encountering the repetition comprises determining the predetermined direction of the diagram operand point corresponding to the character of the password as encountering the repetition when a diagram operand point of the predetermined direction of the diagram operand point corresponding to the character of the password is same as the diagram operand point corresponding to the character of the password.

13. The method of claim 6, further comprising:
configuring a diagram operand point corresponding to the predetermined direction of the operand point as a diagram operand point corresponding to the continuing character of the password when the diagram operand point corresponding to the character of the password encounters a dead end and the predetermined direction of the diagram operand point does not encounter a boundary hitting or is in a repetition.

14. A system comprising: one or more processors; and memory including instructions executable by the one or more processors, which when executed perform the following steps:

receiving a diagram at a computing device, the diagram being inputted by a user to imitate an additional diagram that is generated at an additional computing device for authenticating a password;

transferring operand points derived from the diagram to a server for password authentication, the password being authenticated by comparing the operand points derived from the diagram and operand points corresponding to characters of the password, wherein the operand points corresponding to characters of the password are obtained by:

a diagram starting point as a diagram operand point corresponding to a character of the password; and retrieving a diagram operand point corresponding to a continuing character of the password based on a predetermined direction of the diagram operand point in correspondence with the character of the password, wherein ending the retrieving of the diagram operand point corresponding to the continuing character of the password in response to a determination that the diagram operand point corresponding to the character of the password encounters a dead end; or updating the character of the password in response to a determination that the diagram operand point corresponding to the character of the password does not encounter a dead end and the predetermined direction of the diagram operand point encounters a boundary hitting or is in a repetition, and determining a predetermined direction in correspondence with the diagram operand point of the updated character of the password; and receiving a result of the password authentication from the server.

15. The system of claim 14, wherein the password is obtained by the additional computing device using a password algorithm.

16. The system of claim 14, wherein the password is obtained by the server using a password algorithm.

17. The system of claim 14, wherein both of the diagram and the additional diagram include a diagram of a folded line.

* * * * *